United States Patent [19]

Meyers

[11] 3,838,629

[45] Oct. 1, 1974

[54] FLUID COMPENSATING DEVICE FOR HYDRAULIC RATIO CHANGER POWER BRAKE BOOSTER

[75] Inventor: Robert E. Meyers, South Bend, Ind.

[73] Assignee: The Bendix Corporation, South Bend, Ind.

[22] Filed: Mar. 23, 1973

[21] Appl. No.: 344,294

[52] U.S. Cl. .................. 91/391, 91/460, 60/587
[51] Int. Cl. .................. F15b 13/10, F15b 17/02
[58] Field of Search ............. 91/460, 391 R; 60/548, 60/587, 555

[56] References Cited
UNITED STATES PATENTS

| | | | |
|---|---|---|---|
| 2,977,934 | 4/1961 | Pulkownik | 91/460 |
| 3,113,489 | 12/1963 | Cruse et al. | 91/460 |
| 3,683,619 | 8/1972 | Belart | 60/548 |

FOREIGN PATENTS OR APPLICATIONS

| | | | |
|---|---|---|---|
| 174,396 | 1/1922 | Great Britain | 91/460 |

Primary Examiner—Paul E. Maslowsky
Attorney, Agent, or Firm—Ken C. Decker; William N. Antonis

[57] ABSTRACT

A hydraulic brake boost mechanism includes valve means and a power piston which is sealingly disposed in a chamber in fluid communication with the valve means. A foot pedal operated hydraulic ratio changer having a released position and an applied position includes an input plunger which projects into a control chamber in fluid communication with the valve means and the power piston to effect displacement of the valve means and piston when the pressure in the control chamber, as developed by the input plunger, attains a predetermined value. A device is operatively connected to the hydraulic ratio changer to communicate the control chamber with a source of fluid to compensate for loss or gain in volume of fluid in the control chamber when the ratio changer is returned to its released position.

9 Claims, 1 Drawing Figure

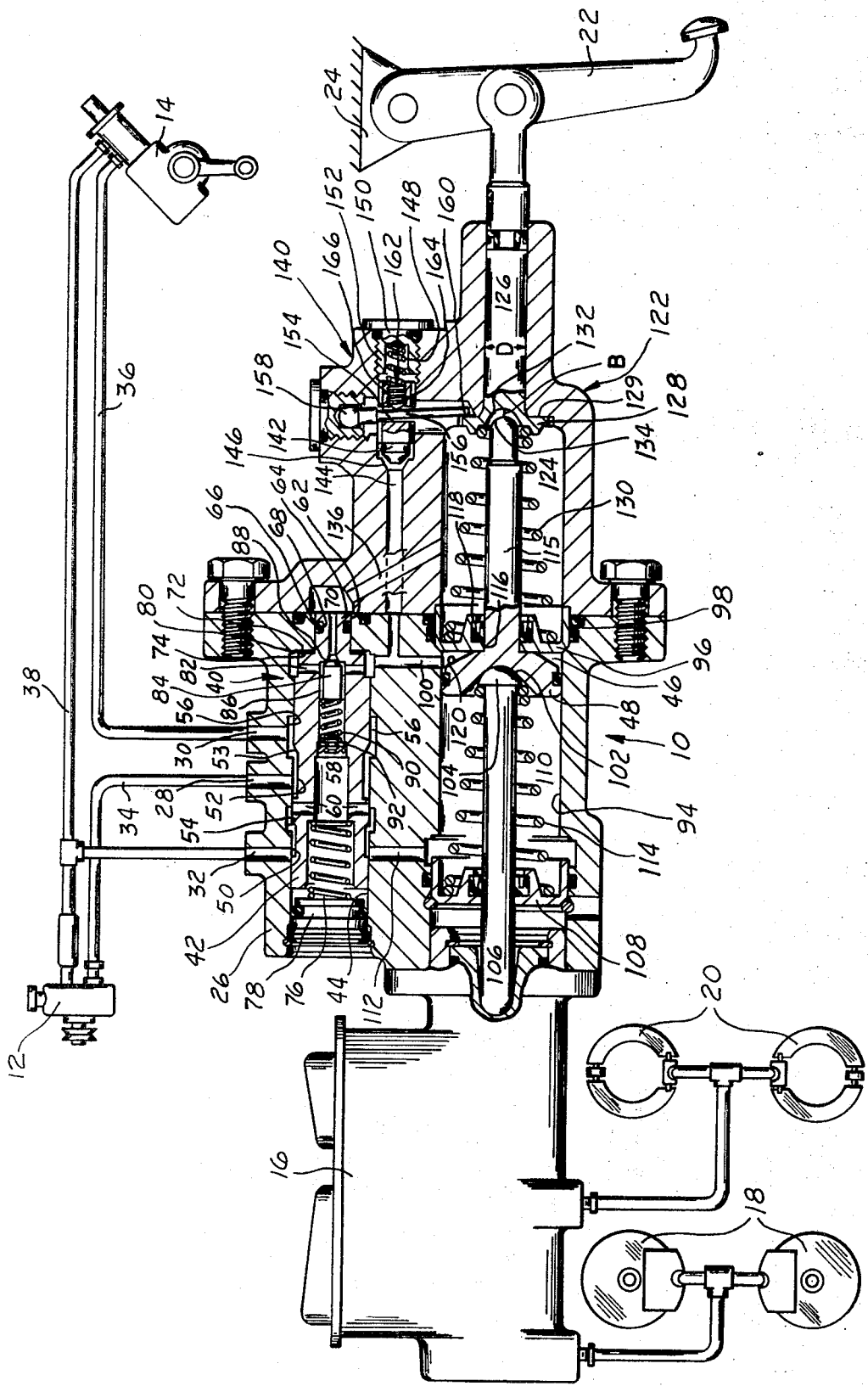

FLUID COMPENSATING DEVICE FOR HYDRAULIC RATIO CHANGER POWER BRAKE BOOSTER

BACKGROUND OF THE INVENTION

The present invention relates to a hydrualic power brake booster having a manually operated hydraulic ratio changer including a plunger located in a control chamber which is in fluid communication with a valve member and a power piston to effectuate displacement of the valve member and piston upon displacement of the plunger into the control chamber. More particularly the invention concerns means operative upon return of the plunger to its released position to compensate for loss or gain in volume of fluid in the control chamber.

Although hydraulic power brake boosters have made substantial inroads into the field of air over vacuum type power brake boosters which are presently used on automotive vehicles, the structural complexity and associated higher manufacturing costs of the mechanical ratio changer used on the hydraulic power brake booster have been major factors in preventing its widespread adoption.

Reference is made to U.S. Pat. Nos. 2,766,732; 3,119,235; 3,267,663; and 3,603,209, assigned to the common assignee for this invention, as illustrating hydraulic boosters employing mechanical ratio changers. The foregoing factors have been overcome to some extent by a highly competitive hydraulic brake booster utilizing a hydraulic ratio changer of the kind disclosed in U.S. application Ser. No. 250,397, filed May 4, 1972, assigned to Deutsche Bendix Ausrustungs GmbH, Saarbrucken 1 Postfach 1309 Germany, a foreign affiliate of the assignee of the present invention. One problem, however, of the hydraulic ratio changer is its susceptibility to large pedal travel variations due to loss or gain of fluid within the control chamber. The prior art attempted to correct for this fluid volume change in the control chamber by communicating the chamber with the fluid reservoir when the power piston is returned to its released position, admitting or expelling fluid from the chamber, as the case may be. This approach to fluid volume compensation was found to be inadequate since it is dependent upon power piston position which is not the primary pressure producing member in the chamber. The invention described and claimed herein is an improvement on prior art brake boosters incorporating hydraulic ratio changers. The invention relies upon release of the primary pressure producing input plunger for effecting a change in the volume of fluid in the control chamber.

SUMMARY OF THE INVENTION

This invention relates to a hydraulic power brake booster for a vehicle having a control valve connected in fluid communication with a control chamber and a working chamber, the working chamber sealingly and slidingly receiving a power piston having a first area exposed to the working chamber and a second area exposed to the control chamber, a foot pedal operated input plunger projecting into the control chamber and operatively connected to the piston and the control valve so that displacement of the plunger into the control chamber from a released position to an applied position effects displacement of the piston and valve, and a device operatively connected to the plunger to be actuated by the plunger when in its released position to open the control chamber and when in its applied position to close the last mentioned chamber so that in the released position of the plunger fluid may be dispelled from or replenished in the control chamber and in the applied position of the plunger, the valve and piston are displaced under the influence of fluid pressurization in the control chamber.

This invention further relates to a fluid power brake boost mechanism having a spool valve responsive to and movable proportionately relative to the displacement of a plunger in a fluid filled control chamber from a released position to an applied position for controlling fluid pressure acting on a power piston, the latter of which is also affected directly by the displacement of the plunger in the control chamber, and a compensating valve operative when the plunger is released to compensate for loss or gain in volume of fluid in the control chamber due to temperature variations and relative movement of the operating parts of the mechanism.

This invention also relates to a hydraulic ratio changer for actuating a control valve and a power piston in a fluid power brake mechanism including a manually operated plunger having an end terminating in a control chamber and connected to a compensating valve which opens the chamber when the plunger is in a released position to permit the ingress and egress of fluid to compensate for loss or gain of fluid in the chamber and closes the chamber when the plunger is moved to an applied position to generate a fluid pressure in the chamber which acts on the control valve to move the latter at some predetermined ratio relative to plunger movement.

Therefore, a principal object of the invention is to provide a manually operated hydraulic ratio changer for a hydraulic power brake boost mechanism wherein a plunger pressurizes fluid in a closed chamber when moved to an applied position for operating the boost mechanism and controls an adjustable compensating valve when moved to a released position so that the chamber is opened to admit or expel fluid therefrom to compensate for loss or gain of fluid as the case may be.

DESCRIPTION OF THE DRAWING

The sole FIGURE of the drawing is a schematic view of a vehicle hydraulic system incorporating the teachings of the invention in association with a hydraulic brake boost mechanism illustrated in cross section.

DETAILED DESCRIPTION

Referring now to the drawing reference numeral 10 designates a fluid power boost mechanism connected into a vehicle hydraulic system having an engine driven pump 12 and a steering gear 14 operatively connected to the vehicle wheels, not shown, in a manner well known to those skilled in the art. The boost mechanism 10, may be termed more specifically a hydraulic brake boost mechanism since its specific function is to furnish the driving force to a dual system master cylinder 16 connected to front brakes 18 and rear brakes 20. The initiating force for applying the brakes 18 and 20 is through a brake pedal 22 pivotally suspended from a bracket 24 mounted in the driver's compartment of the vehicle. The boost mechanism 10 includes a housing 26 provided with an inlet port 28, an outlet port 30 and an exhaust port 32. The inlet port 28 is in communication with the outlet port of the pump 12 through the pipe line 34. The outlet port 30 communicates with the steering gear 14 via conduit 36. The exhaust port 32 is connected to conduit 38 which is the return line from the steering gear 14 to the inlet or reservoir side of the pump 12.

The boost mechanism 10 includes a control valve 40, having a spool valve member 42 slidably positioned in bore 44. The valve 40 controls fluid communication between the inlet and reservoir ports and a working chamber 46 of a servomotor in which a power piston 48 is sealingly housed for reciprocal movement. The spool valve 42 is formed with annular recesses 50 and 52 communicating respectively, with the exhaust port 32 and the inlet port 28. The bore 44 is also formed with annular grooves or recesses 54 and 56. Recess 56 communicates with the outlet port 30 for supplying fluid to the gear 14. The recess 54 communicates with a central passage 58 of the spool valve 42 via radial passages 60. One side of recess 52 is chamfered at 53 to insure continuous fluid flow to the steering gear 14 regardless of the position of the spool valve 42. The valve of the steering gear 14 is of the open center type well known in the art and since it forms no part of the invention it needs no further description. The bore 44 is stepped down at 62 to receive a reduced diameter end portion 64 of the spool valve member 42. A seal 66 located in groove 68 prevents leakage from the bore 44 into cavity 70 to which the reduced end portion 64 is exposed. The stepped down portion 62 of the bore 44 forms an abutment 72 against which an end portion 74 of the spool valve is urged by a spring 76, interposed between the spool valve and a plug 78 sealingly located in the end of the bore 44. The abutment 72 and the end 74 of the spool valve form a concentric cavity 80 in the bore 44 which communicates with the central passage 58 of the spool valve via radial passages 82 and axially extending grooves 84 formed in the outer periphery of a relief valve 86 slidably disposed in the central passage 58 in seating engagement with valve seat 88 so as to normally cut off communication between the central passage and the cavity 70. The relief valve 86 is urged against the seat 88 by a spring 90 preloaded between the valve 86 and a washer 92 securely fastened in the central passage of the spool valve.

The working chamber 46 is defined by a cylindrical side portion 94, a wall 96 carried in an annular groove 98 of the side portion 94, and the power piston 48. A passage 100 connects the working chamber 46 to the concentric cavity 80 located at the right end of the spool valve, as viewed in the drawing. The radial passages 82 communicate the cavity 80 to the central passage 58. The power piston 48 is provided with a concave center section 102 on its back side which accommodates a convex bearing member 104. The convex member is formed at one end of a force transmitting rod 106 drivably connected to the master cylinder 16 at its other end. The rod 106 passes through an end closure member 108 so as to define an exhaust chamber 110 which communicates continuously with the exhaust port 32 through a passage 112 and the recess 50 of the spool valve. Appropriate sealing is provided for the rod 106 and closure member to prevent loss of fluid from the chamber 110. A return spring 114, for the power piston 48, is disposed concentrically of the rod 106 so that one end of the spring is in abutment with the closure member 108 and the other end of the spring bears against the convex bearing member 104 to thereby urge the piston to the right in the FIGURE against the wall 96.

The power piston 48 is provided with an output plunger 115 projecting from the front side thereof and through an opening 116 in the wall 96. A seal 118 located in the wall 96 provides adequate sealing for the output plunger 115. Accordingly, the pressure in the chamber 46 acts only on the concentric area 120 of the piston 48, which is defined as the total area of the piston face less the area of that portion of the output plunger projecting through the wall 96.

The control valve 40 and the power piston of the servomotor are operatively connected to a hydraulic ratio changer 122 having a control chamber 124 into which an input plunger 126 extends in axial alignment with the output plunger 115. The input plunger 126 has a flange 128 on its inner end which engages the wall 129 of the control chamber so as to limit movement of the plunger 126 to the right, as viewed in the FIGURE. The plunger 126 is urged to the right by a spring 130 interposed between the flange 128 and the wall 96. The outer end of the input plunger 126 is connected to the pedal 22 for manual actuation. Since the power boost mechanism 10 must be capable of manually actuating the brakes in the event of failure of fluid power the input plunger 126 and the output plunger 115 must be sufficiently rugged structurally to perform this function. Accordingly, the inner central portion of the input plunger 126 is formed with a concave bearing surface 132 on which a convex end section 134 of the output plunger 115 bears when a malfunction of the mechanism allows these aligned plungers to engage. In the released position of the input plunger 126, as viewed in the FIGURE, there is a gap "B" between the convex end 134 and the concave end portion 132 to permit incipient displacement of the input plunger 126 into the control chamber 124 without effecting engagement between the plungers during normal braking conditions. A passageway 136 establishes communication between the cavity 70 and the control chamber 124. Initial movement of the input plunger 126 to the left must generate sufficient pressure in the control chamber 124 and act on the reduced end portion 64 of the spool valve to cause the spool valve to overcome the preload on the spring 76, admitting fluid under pressure to the power chamber 46, before closing the gap "B." The spool valve 42 is only partially hydraulically balanced end to end by the concentric cavity 80 and connecting radial passages 82 communicating with the central passage 58 which leaves the reduced end portion 64 on which control chamber pressure acts unbalanced. This same pressure which acts on the reduced end portion 64 of the spool valve to effect displacement is not adequate to cause displacement of the output plunger 115 and its associated piston 48 against the combined spring loading on the piston including that of the return spring 114 and the master cylinder 16. Control valve movement or displacement with respect to input plunger displacement is in the ratio of the areas between the end portion 64 and the end of the input plunger 126, as represented by diameter "D." This ratio is determined primarily by brake system design requirements. As shown, the area of the input plunger 126 is the larger by about two to one. It is also noted that the area of the input plunger 126 is approximately twice that of the output plunger 115, so that the displacement of fluid in the control chamber is such as to cause the output plunger to move to the left at twice the rate of the input plunger. This relationship means that the spool valve movement will be such as to admit fluid pressure to the power piston before closing the gap "B." It will be observed that the pressure generated in the control chamber 124 during normal operation will be greater than the pressure acting in the power chamber 46 by an amount required to overcome the spring 76, urging the spool valve to the right, as viewed in the FIGURE.

Since control valve actuation depends upon pressure developed in the control chamber 124, including cavity 70, and this pressure is developed in relation to the displacement of the input plunger 126 into the control chamber, it is obvious that variations in volume of fluid in the control chamber 124, whether a loss or a gain in fluid due to change in position of the relatively movable parts of the mechanism or caused by variations in temperature of the fluid, will have an adverse effect on the braking quality of the brake boost mechanism. To cope with this vexatious problem, I propose as a solution an improved device or valve 140 which compensates for loss or gain in volume in the chamber 124 to thereby maintain optimum displacement or travel between the input plunger 126 and the spool valve 42. The device or valve means 140 includes a valve member 142 slidably mounted in a passage 144, communicating the control chamber 124 to the fluid exhaust 32 which is connected to the reservoir of the pump 12. The valve member 142 is urged toward a seat 146 located in the passage 144 by a spring 148 interposed between the valve member 142 and a plug element 150 sealingly located in a bore 152 intersecting the passage 144. The valve member 142 is provided with a transverse opening 154 for receiving an actuating pin 156 pivotally suspended at end 158 and having its other end 160 operatively connected to the foot pedal operated input plunger 126. The flange 128 of the input plunger 126 engages the pin end 160 when the input plunger is in released position, as viewed in the FIGURE, forcing the valve member to the right against the spring 148 to thereby communicate the control chamber 124 to the pump fluid reservoir via the passage 144, passage 100, radial passages 32, central passage 58, radial passages 60, annular recesses 50 and 54, and exhaust port 32. The valve member 142 may also be unseated independently of engagement with the pin by a differential in pressure acting in the passage 144 and the control chamber 124 caused by return of the input plunger 126 upon release from an applied position. Upon displacing the input plunger to the left, as viewed in the FIGURE, the flange 128 moves away from the pin end 160, allowing the spring 148 to close the valve member 142 on the seat 146 so that communication between the chamber 124 and the fluid exhaust port 32 is cut-off. The amount of pivotal movement of the pin 156 before engagement or disengagement between the valve member 142 and the seat 146 is controlled by adjusting means 162 comprising a threaded element 164 carried in a correspondingly threaded bore 166 of the member 142. The adjusting means 162, operatively connected to the central or intermediate portion of the pin to regulate limited movement of the valve member with respect to the seat 146, provides for maximum control over initial pedal travel in closing the valve member 142 on the seat 146 so that displacement of the input plunger into the chamber 124 concurrently generates a pressure within the chamber with a minimum of delay, causing displacement of the spool valve 42. The response of spool valve 42 to input plunger 126 displacement is subject to control over a wide range depending upon the requirements of the braking system.

MODE OF OPERATION

With the pump 12 in operation and the brake pedal 22 in release position, as illustrated in the drawing, the fluid pressure in the working chamber 46 and the control chamber 124 are essentially zero except for a small back pressure, since the control valve 40 now communicates these chambers through their respective associated passages with the exhaust port 32 and thence to the pump 12 reservoir via line 38. In the brake released position the pin 156 of the device 140 is pivoted to the right by engagement with the flange 128 which unseats the valve member 142 from the seat 146. The control chamber 124 is now open to receive or expel fluid, as the case may be, to maintain the desired fluid volume for the best braking performance. Also the inlet port 28 is communicated to the outlet port 30 through the annular recesses 52 and 56 so that hydraulic fluid is circulated through the line 36, steering gear 14, and line 38 to the pump reservoir. To make a brake application the foot pedal 22 is moved from a released position, as aforementioned, to an applied position by depressing the foot pedal. This movement of the pedal 22 displaces the input plunger 126 and the flange 128 into the control chamber 124, allowing the actuating pin 156 and valve member 142 to move to the left under the influence of the resilient member 148 until the valve member 142 abuts the seat 146 to thereby close the control chamber. Any further displacement of the input plunger 126 into the control chamber 124 generates a pressure therein acting on the reduced end 64 of the spool valve to effect movement thereof to the left against the spring 76. This pressure in the control chamber which acts on the spool valve causing its displacement to the left also acts on the output plunger 115 of the power piston 48 but it is not sufficient to displace the output plunger and piston against the piston return spring 114. Because of the difference in areas between the input plunger 126 and the reduced end 64, with the input plunger having the larger area, displacement of the spool valve with respect to plunger displacement will be in the ratio of their areas. Displacement of the output plunger 115 with respect to the input plunger 126 is also in relation to their respective areas.

Assuming proper adjustment to the compensating valve 140, under normal conditions of operation with hydraulic fluid power available from the pump 12, the gap "B" will not be completely closed during braking. This is so, because as the input plunger 126 is initially moved to the left it only partially closes the gap "B" before closing the valve 140, after which the control valve is displaced to admit pressure to the working chamber which displaces the output plunger 115 to the left. In providing gap "B" pedal travel and input plunger displacement are closely controlled, permitting not only shorter pedal stroke but faster control valve response. This is due to utilizing the entire fluid displacement, once the valve 140 is closed, within the chamber 124 to act upon the reduced end portion of the spool valve. There is no hydraulic displacement of the output plunger 115 prior to actuation and displacement of the spool valve inasmuch as the preload on the return spring 76 resisting the spool valve displacement is less than the total resistive force opposing movement of the output plunger and its associated piston.

Upon initially releasing the input plunger 126 from an applied position, the return spring 130 displaces the input plunger end and flange 128 to the right which lowers the pressure in the control chamber 124 due to change in volume. This lower pressure in the control chamber 124 creates a pressure differential across the valve member 142 of the compensating valve 140 of sufficient unbalance to overcome the spring 148 and open the control chamber to pump reservoir. It is significant that opening of the control chamber for fluid replenishment is before the input plunger 126 has attained the released position in the FIGURE, i.e., before the flange 128 has engaged the pin 156. This action of the compensating valve 140 is response to the pressure differential acting on the valve member 142 minimizes drawing a vacuum and shortens the time for replenishing the chamber with an adequate volume of fluid.

Should the brake boost mechanism malfunction in some manner due to pump failure or a sticky control valve, the power piston 48 may be manually driven to operate the master cylinder 16. Depressing the pedal 22, under such circumstances of power failure, generates fluid pressure in the control chamber 124, as under normal operation, displacing the spool valve to the left against the return spring 76. At this point, i.e., after displacing the spool valve, further input plunger displacement generates sufficient pressure in the control chamber 124 and acting on the relief valve 86 to unseat it from the seat 88, communicating the control chamber 124 to exhaust port 32. This release of pressure from the control chamber 124 allows the input plunger to advance to the left, closing the gap "B" so that the plunger 126 is now mechanically drivably connected to the power piston extension plunger 115 for manual operation of the master cylinder and its associated brakes.

I claim:

1. In a hydraulic power boost mechanism having a working chamber and a control valve in communication with an inlet pressure source and a fluid reservoir for controlling the pressure in the working chamber and a power piston having an end exposed to the working chamber and an output plunger on said end sealingly projecting beyond the working chamber, and a hydraulic ratio changer operatively connected to the control valve and to the power piston and including a control chamber into which the output plunger projects and further includes a manually operated input plunger axially aligned with the output plunger and slidably displaceable in the control chamber from a released position to an applied position for generating fluid pressure in the control chamber to displace the control valve, the improvement which comprises:

a device in communication with the fluid source and operatively connected to the input plunger to be actuated thereby when in released position to compensate for loss or gain in volume of fluid in the control chamber.

2. The improvement in claim 1 wherein said device includes a passage communicating the control chamber to the fluid reservoir, a valve in the passage urged toward closed position by resilient means, and an actuating pin operatively connected to the valve and the input plunger for placing the valve in open position when the input plunger is in the released position.

3. The improvement in claim 2 wherein the valve further includes a seat in the passage, a valve member slidable in the passage and urged toward the seat by the resilient means, said valve member having a transverse opening therein through which the actuating pin passes, said actuating pin being pivotally suspended at one end with the other end operatively connected to the input plunger so that the central portion of the actuating pin which passes through the transverse opening engages the valve member to permit controlled seating of the valve member.

4. The improvement in claim 3 wherein adjustable means is operatively connected to the valve member and to the pin to thereby control seating of the valve member and input plunger displacement relative to control valve position.

5. In a hydraulic power boost mechanism having a working chamber and a spool valve for controlling pressure in the chamber and a piston having an end exposed to the chamber and an output plunger integral with the piston and having an end sealing projecting beyond the chamber, and a hydraulic ratio changer operatively connected to the spool valve and to the piston and including a control chamber into which the output plunger end projects and further including a manually operated input plunger having an end extending into the control chamber and displaceable therein from a released position to an applied position for generating fluid pressure in the control chamber, said spool valve having an end portion exposed to the control chamber pressure and responsive thereto for controlling the working chamber pressure, the improvement which comprises:

valve means connected to the input plunger for opening the control chamber when the input plunger is in released position to compensate for loss or gain in fluid in the control chamber and for closing the control chamber when the input plunger is moved in the applied position, said input plunger end being in axial alignment with and spaced from the output plunger end to provide a gap between said ends when the input plunger is in released position so that displacement of the input plunger toward an applied position closes said valve means before engagement between said ends to thereby increase the rate at which the control chamber pressure rises.

6. The improvement in claim 5 wherein said valve means includes a passage communicating the control chamber with a fluid exhaust port, a seat in the passage, a valve member urged onto the seat by resilient means, and an actuating pin operatively connected to the valve member and to the input plunger for moving the valve member off said seat when the input plunger is released.

7. The improvement in claim 6 wherein said valve member is formed with a transverse opening through which the actuating pin passes, said pin being pivotally supported at one end with the other end operatively connected to the input plunger so that the central portion of the pin which passes through the transverse opening engages the valve member to permit controlled seating of the valve member.

8. The improvement in claim 7 wherein said valve member is provided with adjustable means operatively connecting the valve member with the pin so that fluid displacement from the control may be controlled to provide the desired spool valve response.

9. In a hydraulic power boost mechanism having a working chamber and a spool valve for controlling pressure in the chamber and a piston having an end exposed to the chamber and an output plunger integral with the piston and having an end sealingly projecting beyond the chamber, and a hydraulic ratio changer operatively connected to the spool valve and to the piston and including a control chamber into which the output plunger end projects and further including a manually operated input plunger having an end extending into the control chamber and displaceable therein from a released position to an applied position for generating fluid pressure in the control chamber, said spool valve having an end portion exposed to the control chamber pressure and responsive thereto for controlling the working chamber pressure, the improvement which comprises:

valve means responsive to differential pressure for communicating the control chamber with a fluid source upon intial release of the input plunger from an applied position so that the volume of fluid in the control chamber is partially replenished before the input plunger is moved to its released position.

* * * * *